(12) United States Patent
Fragola

(10) Patent No.: US 10,471,598 B1
(45) Date of Patent: Nov. 12, 2019

(54) ROBOTIC PLATFORM

(71) Applicant: Eric Fragola, Fairfield, CA (US)

(72) Inventor: Eric Fragola, Fairfield, CA (US)

(*) Notice: Subject to any disclaimer, the term of this patent is extended or adjusted under 35 U.S.C. 154(b) by 222 days.

(21) Appl. No.: 15/620,426

(22) Filed: Jun. 12, 2017

Related U.S. Application Data

(60) Provisional application No. 62/348,141, filed on Jun. 10, 2016.

(51) Int. Cl.
| | |
|---|---|
| *G06F 19/00* | (2018.01) |
| *B25J 9/16* | (2006.01) |
| *A63B 67/00* | (2006.01) |
| *A63B 67/06* | (2006.01) |
| *A63F 7/00* | (2006.01) |

(52) U.S. Cl.
CPC .......... *B25J 9/1676* (2013.01); *A63B 67/002* (2013.01); *A63B 67/06* (2013.01); *A63F 7/0017* (2013.01); *B25J 9/1694* (2013.01); *A63F 2250/024* (2013.01); *Y10S 901/01* (2013.01)

(58) Field of Classification Search
CPC ..... B25J 9/1676; B25J 9/1694; A63B 67/002; A63B 67/06; A63F 7/0017; A63F 2250/024; Y10S 901/01
USPC ................................. 700/245, 255
See application file for complete search history.

(56) References Cited

U.S. PATENT DOCUMENTS

| | | | |
|---|---|---|---|
| 5,523,131 A | 6/1996 | Isaacs et al. | |
| 6,520,843 B1 * | 2/2003 | Halley | B24B 9/065 |
| | | | 451/285 |
| 6,629,874 B1 * | 10/2003 | Halley | B24B 9/065 |
| | | | 451/11 |
| 7,187,998 B2 | 3/2007 | Okamoto et al. | |
| 7,269,479 B2 | 9/2007 | Okamoto et al. | |
| 7,805,959 B2 | 10/2010 | Webb et al. | |
| 8,028,995 B2 | 10/2011 | Hoffer | |
| 8,145,353 B1 * | 3/2012 | Cotner | G07F 17/0092 |
| | | | 700/236 |
| 8,509,947 B2 | 8/2013 | Jarisch et al. | |
| 8,662,501 B1 | 3/2014 | Perales | |
| 9,010,759 B2 | 4/2015 | McDonnell | |
| 2012/0035799 A1 | 2/2012 | Ehrmann | |
| 2012/0169012 A1 | 7/2012 | Parker et al. | |

(Continued)

OTHER PUBLICATIONS

Green Head, Remote Controlled Armored Drink Carrier, website available at: http://www.thegreenhead.com/2012/08/remote-controlled-armored-drink-carrier.php.

(Continued)

*Primary Examiner* — Ronnie M Mancho
(74) *Attorney, Agent, or Firm* — Law Office of Michael O'Brien

(57) ABSTRACT

A robotic platform is configured to transport a cup. The robotic platform includes a rack housing that has a top side and a bottom side. The top side has a plurality of cup slots configured to accommodate the cup. At least one drop detection sensor and at least one obstacle avoidance sensor are mechanically coupled to the rack housing. An integrated circuit is electrically coupled to a battery, the at least one drop detection sensor, and the at least one obstacle avoidance sensor, a first geared motor and a second geared motor. The geared motors are attached to wheels. The integrated circuit is programmed to determine if a sensor has a data above set point, and then executing a move path.

5 Claims, 7 Drawing Sheets

(56) References Cited

U.S. PATENT DOCUMENTS

2013/0115033 A1* 5/2013 Lukes .................... B65B 35/24
                                                      414/564
2014/0027983 A1  1/2014 Keebler
2015/0190927 A1  7/2015 Sutherland et al.
2015/0226759 A1* 8/2015 Connolly ............. G01N 35/109
                                                      435/287.3

OTHER PUBLICATIONS

Bewild, Spin Pong: Spinning Beer Pong Rack, website, available at: http://www.bewild.com/spporobepora.html.
VIHOO113, Holder Bot Profile, Lego Mindstorms, available at: http://www.us.lego.com/en-us/mindstorms/community/robot?projectid=135f22cf-eb0c-48af-a5e0-740af46efeb7.

* cited by examiner

ROBOTIC PLATFORM

RELATED APPLICATION

This application claims priority to provisional patent application U.S. Ser. No. 62/348,141 filed on Jun. 10, 2016, the entire contents of which is herein incorporated by reference.

BACKGROUND

As explained in U.S. Patent Application Pre-Grant Publication 2004/0188942, filed by Trokan, "The Traditional Game of "Beer-Pong" (also known as "Beruit") is an immensely popular beer drinking game played throughout the United States. It is regularly played on university and college campuses; at beach house parties, and other festive occasions at which alcoholic beverages, such as beer, are present. Such festive occasions are typically attended by students in their twenties. The rules and playing styles of "Beer-Pong" are fairly consistent throughout the country. Generally, two or four individuals participate at one time. These individuals are typically divided into two opposing teams. Each team arranges ten (10) to twenty (20) cups in the shape of a pyramid near the end of a table. The arrangement of cups at the beginning of the game should resemble the initial rack of pool balls in a game of "eight-ball". Each team thereafter fills each cup with a pre-selected amount of beer. Filling is continued until each cup is about ¼ to about ½ full. The players then take turns tossing or bouncing beer-pong balls across the length of a table. An object of the game is to cause a beer-pong ball to land in an opponent's cup. If a player's opponent succeeds in "making a shot", that player must drink the cup into which the beer-pong ball landed. The empty cup is then removed from the table. A team that successfully eliminates each of the opponents' cups first is the victor. When this occurs, the losing team must "down" the entire contents of the winning team's remaining filled cups."

Prior to embodiments of the disclosed invention, the Beer-Pong arrangement was largely static. Systems for movement lacked effective electronic controls. Embodiments of the disclosed invention solve this problem.

SUMMARY

A robotic platform is configured to transport a cup. The robotic platform includes a rack housing that has a top side and a bottom side. The top side has a plurality of cup slots configured to accommodate the cup. At least one drop detection sensor and at least one obstacle avoidance sensor are mechanically coupled to the rack housing. An integrated circuit is electrically coupled to a battery, the at least one drop detection sensor, and the at least one obstacle avoidance sensor, a first geared motor and a second geared motor. A first geared motor is mechanically coupled to the rack housing and a first wheel. The first wheel extends through the bottom side. The first geared motor is electrically coupled to the integrated circuit. A second geared motor is mechanically coupled to the rack housing and a second wheel. The second wheel extends through the bottom side. The second geared motor is electrically coupled to the integrated circuit. The integrated circuit is programmed to iteratively perform the following steps until a data above set point is obtained. First, checking each sensor for a data point. Then, comparing the data point to the data above set point. Finally, execute a move path from a move library stored on the integrated circuit to engage the first geared motor and the second geared motor.

In some embodiments, the rack housing further includes a first side, smoothly joined to a second side at a first corner. A third side is smoothly joined to the first side at a second corner. The second side is smoothly joined to the third side at a third corner;

In some embodiments, the plurality of cup slots includes a first cup slot, proximate the first corner. A central channel is joined to the first cup slot. The central channel bisects the rack housing toward the third side. A second cup slot is joined to the central channel. A third cup slot and a fourth cup slot are immediately adjacent to the second cup slot. A fifth cup slot is bisected by the central channel. A sixth cup slot and a seventh cup slot are immediately adjacent to the fifth cup slot. An eighth cup slot is immediately adjacent to the sixth cup slot. A ninth cup slot is immediately adjacent to the seventh cup slot. A tenth cup slot is arranged at a termination point of the central channel. An eleventh cup slot and a twelfth cup slot are immediately adjacent to the tenth cup slot. A thirteenth cup slot is immediately adjacent to the eleventh cup slot. A fourteenth cup slot is immediately adjacent to the twelfth cup slot. A fifteenth cup slot is immediately adjacent to the thirteenth cup slot. A sixteenth cup slot is immediately adjacent to the fourteenth cup slot.

In some embodiments, the bottom side is mechanically coupled to a first drop detection sensor that is proximate the first corner, a second drop detection sensor that is proximate the second corner, and a third drop detection sensor that is proximate the third corner. The bottom side further comprises: a first opening, through which a castor wheel extends, a second opening, through which a first wheel extends, and a third opening, through which a second wheel extends.

In some embodiments, a charging port is mechanically coupled to the second side. A first obstacle avoidance sensor is mechanically coupled to the first corner. A second obstacle avoidance sensor is mechanically coupled to the third side proximate the second corner. A third obstacle avoidance sensor is mechanically coupled to the third side proximate the third corner.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
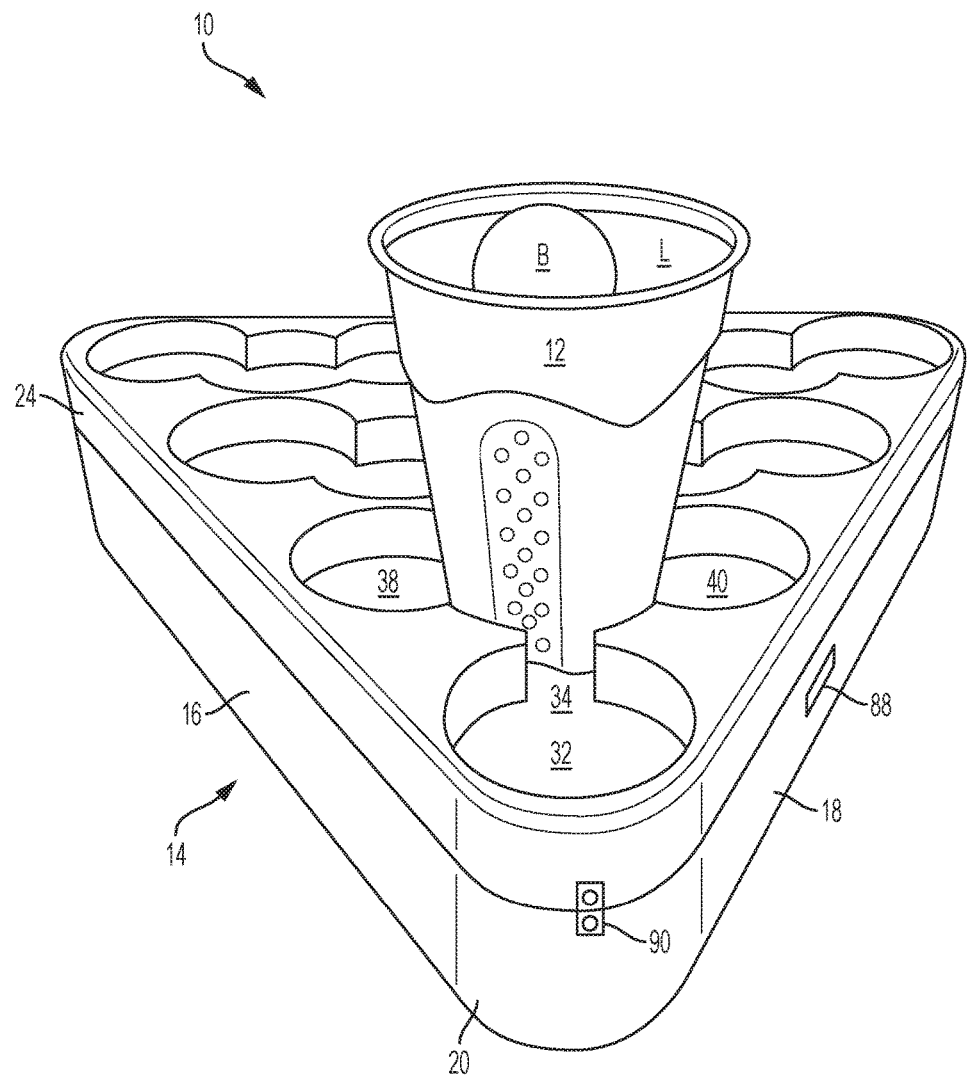
FIG. 1 shows a front perspective view of one embodiment of the present invention shown in use.
Figure 2:
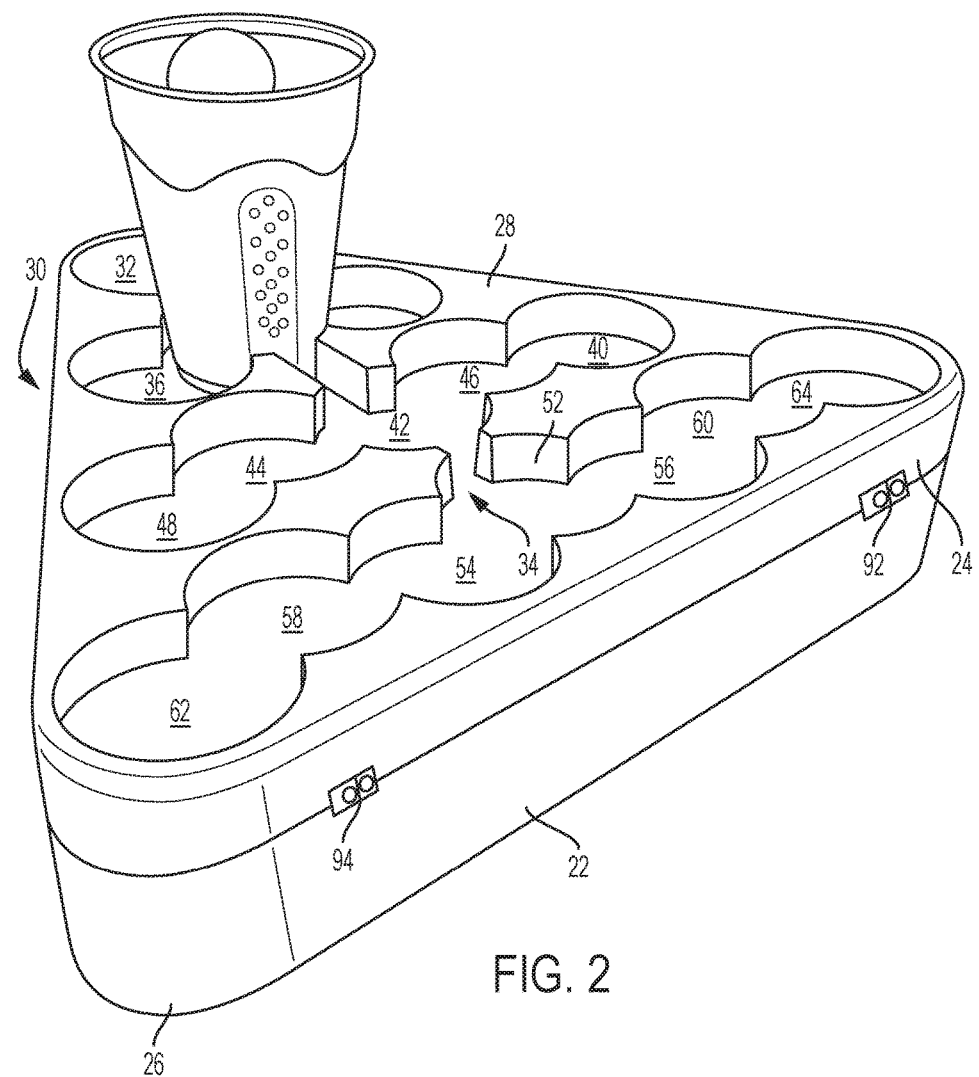
FIG. 2 shows a rear perspective view of one embodiment of the present invention.
Figure 3:
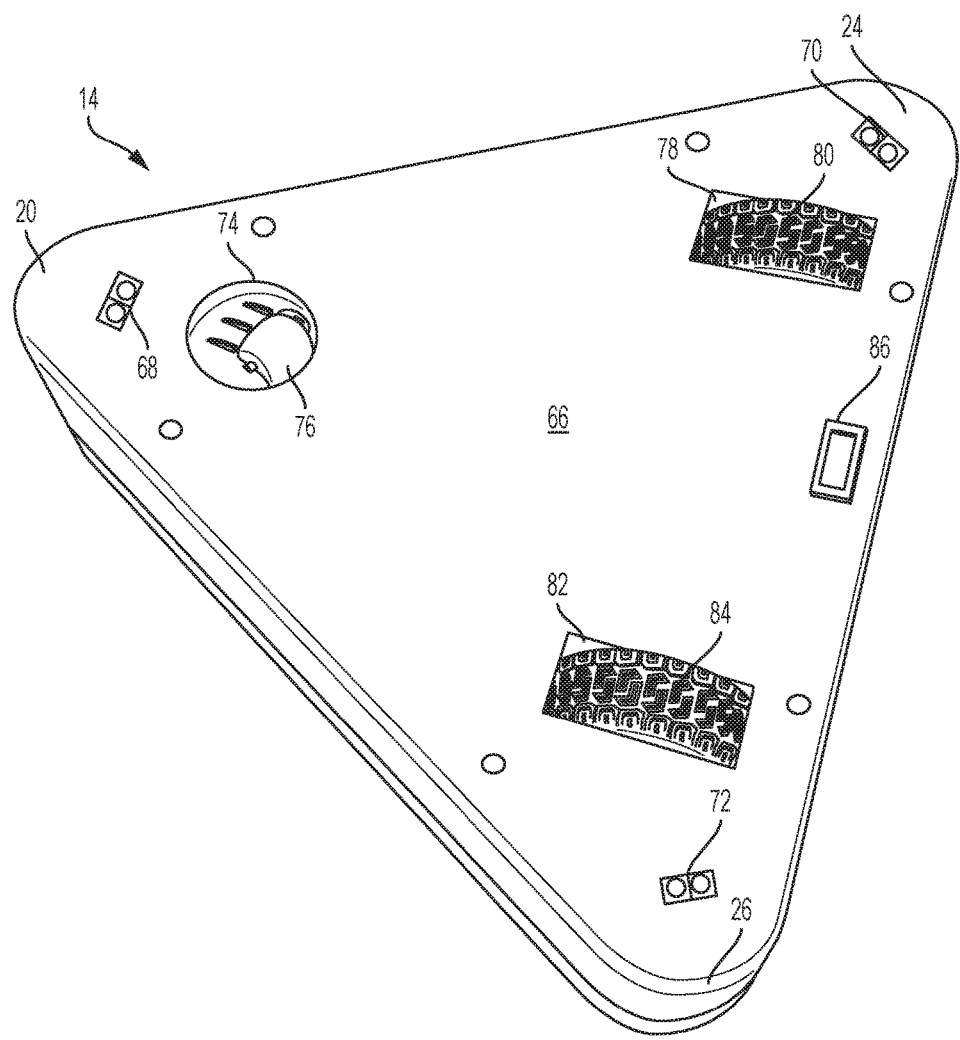
FIG. 3 shows a bottom perspective view of one embodiment of the present invention.
Figure 4:
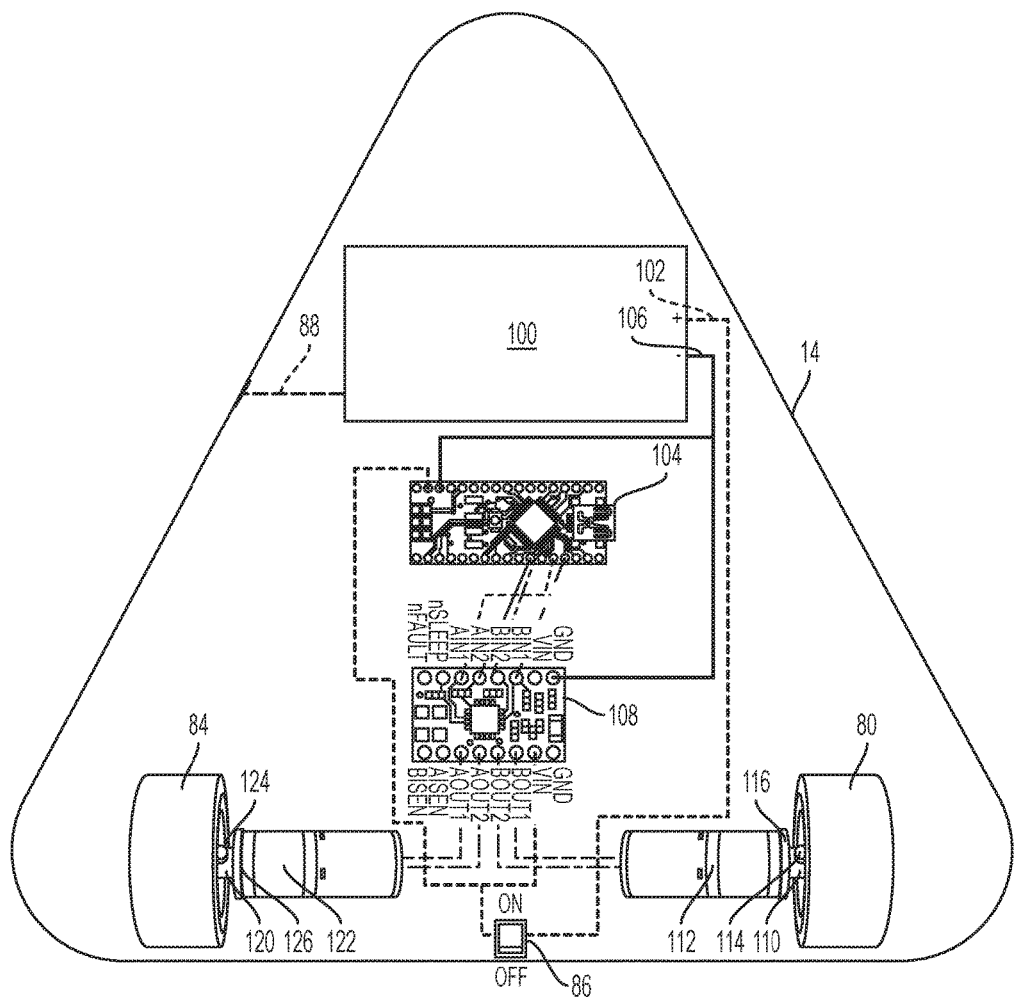
FIG. 4 shows a top view electrical schematic of one embodiment of the present invention.
Figure 5:
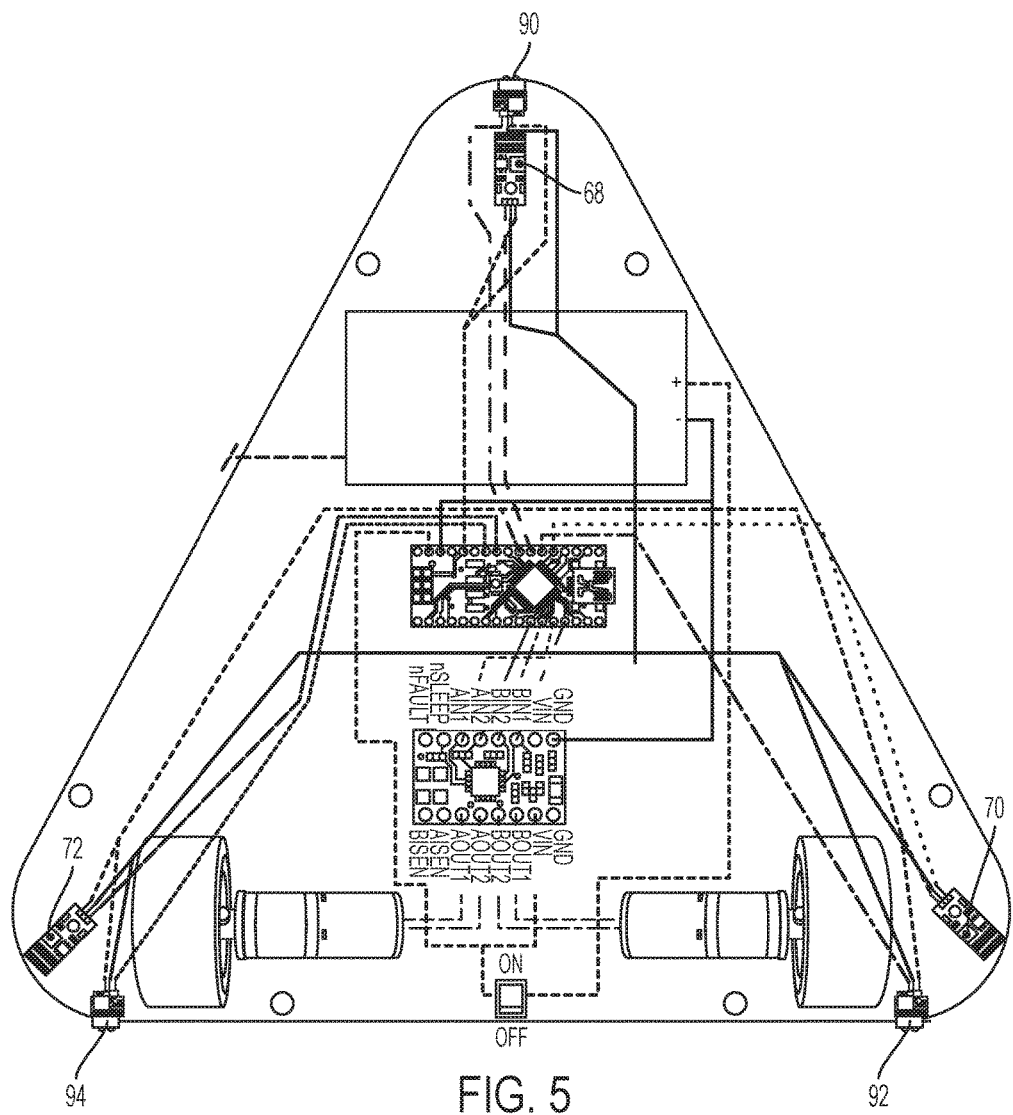
FIG. 5 shows a top view electrical schematic of one embodiment of the present invention.
Figure 6A:
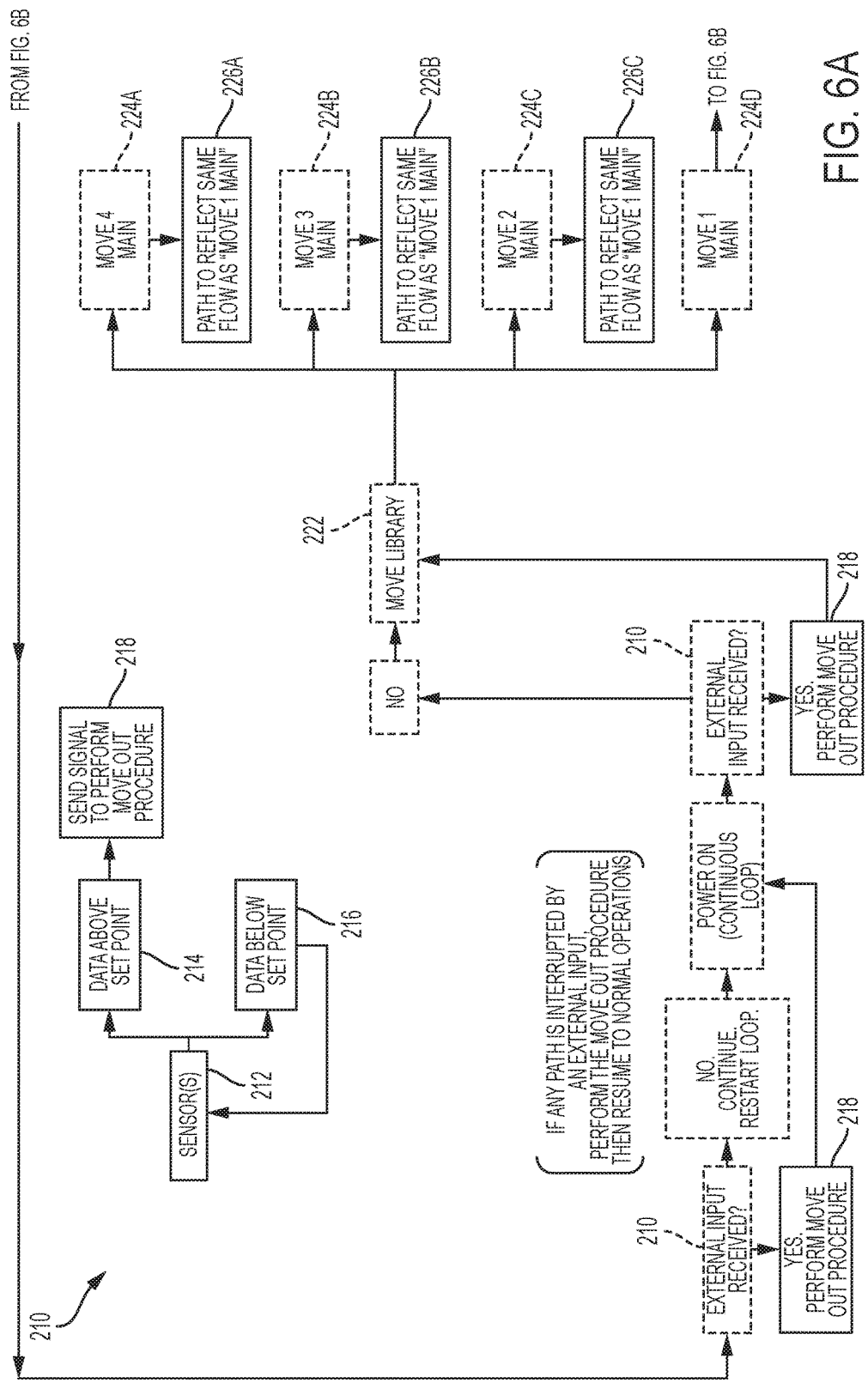
FIG. 6A shows first logic schematic of one embodiment of the present invention.
Figure 6B:
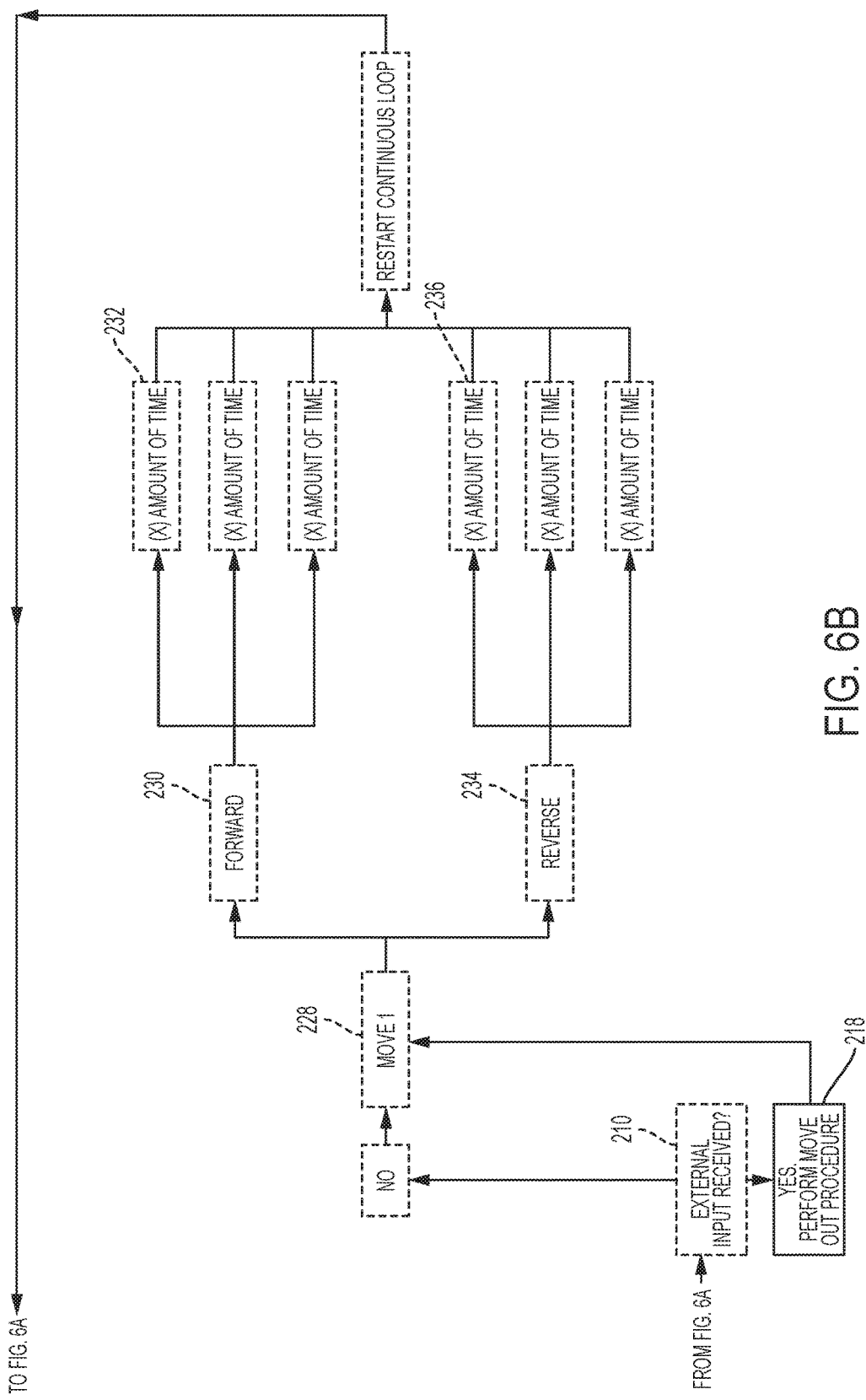
FIG. 6B shows first logic schematic of one embodiment of the present invention.

By way of example, and referring to FIGS. 1-8, a robotic platform 10 can be used for moving cups 12 in such a way that a ball B is not dislodged from a liquid L in a cup 12. The robotic platform 10 further comprises a rack housing 14. The rack housing 14 further comprises a first side 16 smoothly joined to a second side 18 at a first corner 20. The first side 16 is further smoothly joined to a third side 22 at a second corner 24. The second side 18 is smoothly joined to the third side 22 at a third corner 26.

The rack housing 14 further comprises a top side 28. The top side 14 further comprise a plurality of cup slots 30. The plurality of cup slots 30 further comprises a first cup slot 32 proximate the first corner 20. The first cup slot 32 is joined to a central channel 34, which proceeds to bisect the rack housing 14 toward the third side 22. The central channel 34 is joined to a second cup slot 36, which is pictured housing cup 12. The second cup slot 36 is immediately adjacent to a third cup slot 38 and a fourth cup slot 40. The central channel 34 further bisects a fifth cup slot 42. The fifth cup slot 42 is immediately adjacent to a sixth cup slot 44 and a seventh cup slot 46. The sixth cup slot 44 is immediately adjacent to an eighth cup slot 48. The seventh cup slot 46 is immediately adjacent to a ninth cup slot 50. The central channel 34 terminates at a tenth cup slot 52. The tenth cup slot 52 is immediately adjacent to an eleventh cup slot 54 and a twelfth cup slot 56. The eleventh cup slot 54 is immediately adjacent to a thirteenth cup slot 58. The twelfth cup slot 56 is immediately adjacent to a fourteenth cup slot 60. The thirteenth cup slot 58 is immediately adjacent to a fifteenth cup slot 62. The fourteenth cup slot 60 is immediately adjacent to a sixteenth cup slot 64.

The rack housing 14 further comprises a bottom side 66. The bottom side 66 is mechanically coupled to a first drop detection sensor 68 that is proximate the first corner 20. The bottom side 66 is mechanically coupled to a second drop detection sensor 70 that is proximate the second corner 24. The bottom side 66 is mechanically coupled to a third drop detection sensor 72 that is proximate the third corner 26. The bottom side 66 further comprises a first opening 74 through which a castor wheel 76 extends. The bottom side 66 further comprises a second opening 78 through which a first wheel 80 extends. The bottom side 66 further comprises a third opening 82 through which a second wheel 82 extends. The bottom side 66 is mechanically coupled to a power switch 86.

The second side 18 is mechanically coupled to a charging port 88. The first corner 20 is mechanically coupled to a first obstacle avoidance sensor 90. The third side 22 is mechanically coupled to a second obstacle avoidance sensor 92 proximate the second corner 24. The third side 22 is further mechanically coupled to a third obstacle avoidance sensor 94 proximate the third corner 26.

Turning to the interior, a battery pack 100 is electrically coupled to the charging port 88. A positive terminal 102 on the battery pack 100 is electrically coupled to the power switch 86. The power switch 86 is further electrically coupled to a 12-volt socket on a microprocessor 104. A ground socket on the microprocessor 104 is electrically coupled to a negative terminal 106 on the battery pack 100. In some embodiments, the battery pack 100 can be a 7.4V 2S2P 18650 cell battery pack, though others work as well. In some embodiments, the microprocessor 104 can be an Arduino Nano v3, though others work as well. As defined in this application an "integrated circuit" means something that meets the requirements of the microprocessor 104 while meeting the requirements of a motor driver 108.

The negative terminal 106 is further electrically coupled to a ground socket on the motor driver 108. Where the motor driver 108 is a DRV8833, then the following pin arrangement follows: a D7 pin on the microprocessor 104 is electrically coupled to an AIN2 pin on the motor driver 108. A D8 pin on the microprocessor 104 is electrically coupled to a BIN1 pin on the motor driver 108. A D9 pin on the microprocessor 104 is electrically coupled to a AIN1 pin on the motor driver 108. A D10 pin on the microprocessor 104 is electrically coupled to a BIN2 pin on the motor driver 108.

The first wheel 80 is attached to a first hex coupler 110. The first hex coupler 110 is mechanically coupled to a first geared motor 112 with a first set screw 114. The first geared motor 112 is mechanically coupled to the rack housing 14 with a first motor mount 116. The second wheel 84 is attached to a second hex coupler 120. The second hex coupler 120 is mechanically coupled to a second geared motor 122 with a second set screw 124. The second geared motor 122 is mechanically coupled to the rack housing 14 with a second motor mount 126.

The first geared motor 112 further comprises a first gear motor positive terminal that is electrically coupled to a BOUT1 pin on the motor driver 108. The first geared motor 112 further comprises a first motor negative terminal is electrically coupled to a BOUT2 pin on the motor driver 108. The second geared motor 122 further comprises a second gear motor positive terminal that is electrically coupled to an AOUT1 pin on the motor driver 108. The second geared motor 122 further comprises a second motor negative terminal is electrically coupled to a AOUT2 pin on the motor driver 108.

The first drop detection sensor 68 is electrically coupled to an A2 pin, a common ground pin, a common 5V power pin, on the microprocessor 104. The second drop detection sensor 70 is electrically coupled to an A0 pin on the microprocessor and to a ground pin on the motor driver 108. The third drop detection sensor 72 is electrically coupled to an A4 pin on the microprocessor and to a ground pin on the motor driver 108. The first obstacle avoidance sensor 90 is electrically coupled to an A3 pin on the microprocessor and to a ground pin on the motor driver 108. The second obstacle avoidance sensor 92 is electrically coupled to an A1 pin on the microprocessor and to a ground pin on the motor driver 108. The third obstacle avoidance sensor 92 is electrically coupled to an A1 pin on the microprocessor and to a ground pin on the motor driver 108.

An external input loop 210 provides steps for responding to outputs from sensors 212. The sensors 212 comprise at least one element of a sensor set consisting of: the first drop detection sensor 68, the second drop detection sensor 70, the third drop detection sensor 72, the first obstacle avoidance sensor 90, the second obstacle avoidance sensor 92, and the third obstacle avoidance sensor 94. Each of these sensors 12 has a data above set point 214 and a data set below point 216. For instance, for the obstacle avoidance sensors, there is a set point for a distance from which the sensor is triggered. While the sensor 212 is powered the microprocessor 104 iteratively performs the following steps until a data above set point 214 is located: a) checking each sensor 212 for a data point; and b) comparing the data point to the data above set point 214. If the sensor 212 communicates the data above set point 214 to the microprocessor 104 the microprocessor 104 executes a moveout procedure 218. The moveout procedure involves moving the robotic platform 10 in a predetermined direction away from an obstacle or drop point from which the robotic platform 10 can drop. If any path is interrupted by an external input then the robotic platform will perform the move out procedure and resume normal operation.

The external input loop 210 runs as an interrupt to the main loop 220. Main loop 220 involves a series of move paths in a move library 222. Recall that the first wheel 80 and the second wheel 82 are independently powered. This enables the robotic platform to turn 10 under a very tight circumstance simply by rotating the wheels in opposite directions (first wheel 80 is set to forward and second wheel 82 is set to reverse). Similarly, the robotic platform 10 can roll forward and backward. Individually, turning clockwise, turning counter clockwise, rolling forward and rolling backward create a set of basic instructions. A combination of basic instructions is a move path. There are an unlimited number of possible move paths 224A, 224B, 224C, 224D. A series of move paths can be executed in a preset order or in a random order with transition paths or connecting flow paths 226A, 226B, 226C. In either case, the microprocessor 104 chooses a selected move path 228. The selected move path 228 contains a set of forward instructions 230 for each wheel for at least one designated period of time forward 232. The selected move path 228 contains a set of reverse instructions 234 for each wheel for at least one designated period of time forward 236.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A robotic platform, configured to transport a cup; the robotic platform comprising:
   a rack housing, further comprising: a top side and a bottom side; wherein the top side further comprises a plurality of cup slots configured to accommodate the cup;
   at least one drop detection sensor and at least one obstacle avoidance sensor, mechanically coupled to the rack housing; wherein the at least one drop detection sensor is configured to determine whether the robotic platform is proximate a drop point from which the robotic platform could drop;
   an integrated circuit, electrically coupled to a battery, the at least one drop detection sensor, and the at least one obstacle avoidance sensor;
   a first geared motor, mechanically coupled to the rack housing and a first wheel; wherein the first wheel extends through the bottom side; wherein the first geared motor is electrically coupled to the integrated circuit;
   a second geared motor, mechanically coupled to the rack housing and a second wheel; wherein the second wheel extends through the bottom side; wherein the second geared motor is electrically coupled to the integrated circuit;
   wherein the integrated circuit is programmed to:
      iteratively perform these following steps until a data above set point is obtained:
         checking each sensor for a data point; and
         comparing the data point to the data above set point;
      execute a move path from a move library stored on the integrated circuit to engage the first geared motor and the second geared motor.

2. The robotic platform of claim 1, wherein the rack housing further comprises:
   a first side, smoothly joined to a second side at a first corner; and
   a third side, smoothly joined to the first side at a second corner;
   wherein the second side is smoothly joined to the third side at a third corner.

3. The robotic platform of claim 2, wherein the plurality of cup slots further comprises:
   a first cup slot, proximate the first corner;
   a central channel, joined to the first cup slot; wherein the central channel bisects the rack housing toward the third side;
   a second cup slot, joined to the central channel;
   a third cup slot and a fourth cup slot, immediately adjacent to the second cup slot;
   a fifth cup slot, bisected by the central channel;
   a sixth cup slot and a seventh cup slot, immediately adjacent to the fifth cup slot;
   an eighth cup slot, immediately adjacent to the sixth cup slot;
   a ninth cup slot, immediately adjacent to the seventh cup slot;
   a tenth cup slot, arranged at a termination point of the central channel;
   an eleventh cup slot and a twelfth cup slot, immediately adjacent to the tenth cup slot;
   a thirteenth cup slot, immediately adjacent to the eleventh cup slot;
   a fourteenth cup slot, immediately adjacent to the twelfth cup slot;
   a fifteenth cup slot, immediately adjacent to the thirteenth cup slot; and
   a sixteenth cup slot, immediately adjacent to the fourteenth cup slot.

4. The robotic platform of claim 2, wherein the rack housing further comprises a bottom side;
  the bottom side is mechanically coupled to:
  a first drop detection sensor that is proximate the first corner;
  a second drop detection sensor that is proximate the second corner;
  a third drop detection sensor that is proximate the third corner;
  the bottom side further comprises:
  a first opening, through which a castor wheel extends;
  a second opening, through which the first wheel extends;
  a third opening, through which the second wheel extends.

5. The robotic platform of claim 4, further comprising:
  a charging port, mechanically coupled to the second side;
  a first obstacle avoidance sensor, mechanically coupled to the first corner;
  a second obstacle avoidance sensor, mechanically coupled to the third side proximate the second corner; and
  a third obstacle avoidance sensor, mechanically coupled to the third side proximate the third corner.

\* \* \* \* \*